Figure 1:
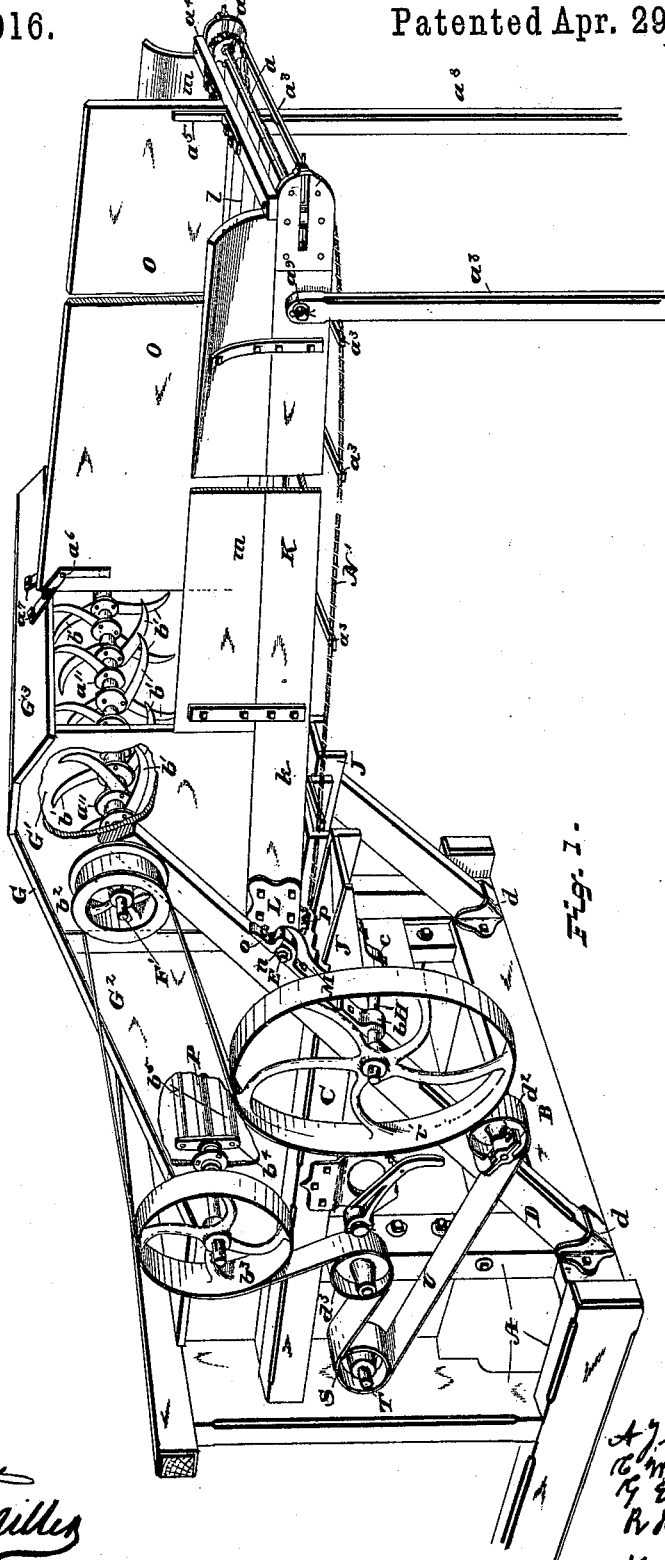

(No Model.) 3 Sheets—Sheet 1.

A. J. SCOFIELD, C. W. SEVILLE, G. E. WILSON & R. H. DIXON.
BAND CUTTER AND FEEDER FOR THRASHING MACHINES.

No. 427,016. Patented Apr. 29, 1890.

Witnesses

Inventor (No Model.) 3 Sheets—Sheet 2.
A. J. SCOFIELD, C. W. SEVILLE, G. E. WILSON &
R. H. DIXON.
BAND CUTTER AND FEEDER FOR THRASHING MACHINES.
No. 427,016. Patented Apr. 29, 1890.
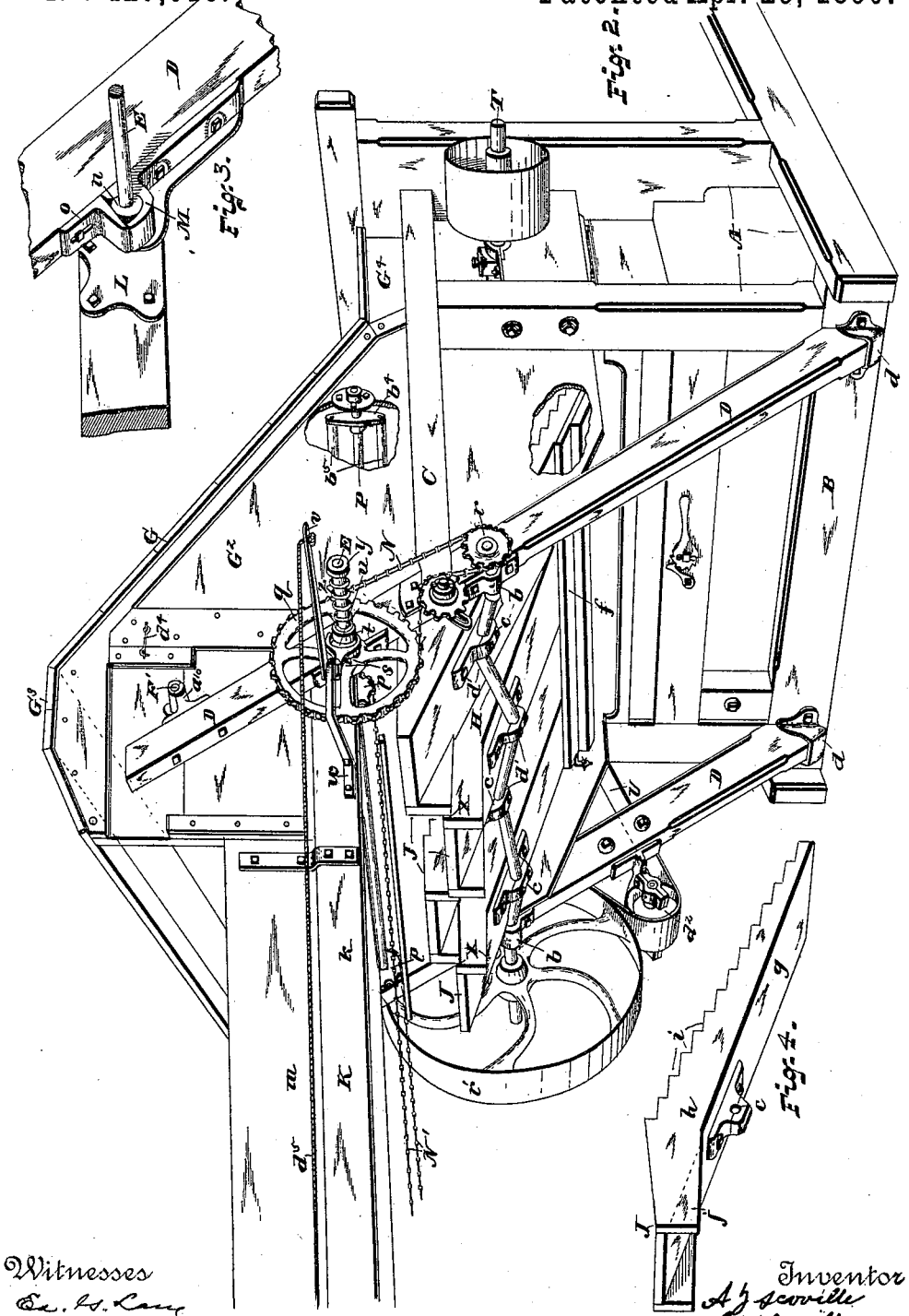

(No Model.) 3 Sheets—Sheet 3.
A. J. SCOFIELD, C. W. SEVILLE, G. E. WILSON & R. H. DIXON.
BAND CUTTER AND FEEDER FOR THRASHING MACHINES.
No. 427,016. Patented Apr. 29, 1890.
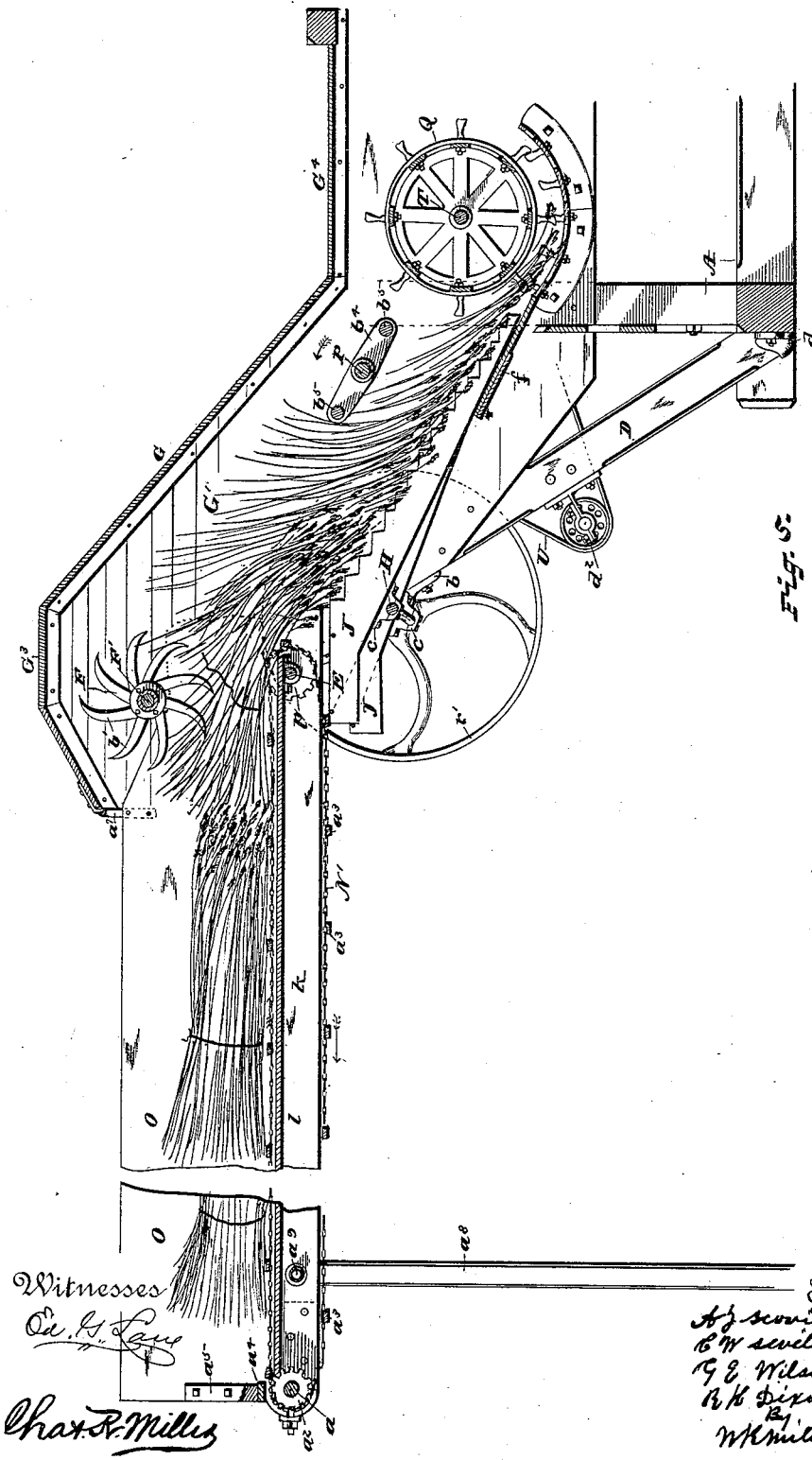

UNITED STATES PATENT OFFICE.

ANDREW J. SCOFIELD AND CHARLES W. SEVILLE, OF ORTONVILLE, AND GEORGE E. WILSON AND ROBERT H. DIXON, OF STILLWATER, MINNESOTA.

BAND-CUTTER AND FEEDER FOR THRASHING-MACHINES.

SPECIFICATION forming part of Letters Patent No. 427,016, dated April 29, 1890.

Application filed March 25, 1889. Serial No. 304,705. (No model.)

*To all whom it may concern:*

Be it known that we, ANDREW J. SCOFIELD, CHARLES W. SEVILLE, GEORGE E. WILSON, and ROBERT H. DIXON, citizens of the United States, ANDREW J. SCOFIELD and CHARLES W. SEVILLE residing at Ortonville, in the county of Big Stone, State of Minnesota, and GEORGE E. WILSON and ROBERT H. DIXON residing at Stillwater, in the county of Washington, State of Minnesota, have invented a new and useful Improvement in Band-Cutters and Feeders for Thrashing-Machines, of which the following is a full, clear, and exact description, reference being had to the accompanying drawings, making part of this specification.

This invention relates to improvements in machines for feeding grain to thrashing-machines, the object of which is to provide means for conveying bundles of grain to the machine, to cut the bands, and to pass the grain into the throat of the machine, to raise the butts of the cut bundles, to depress the heads, and to feed the grain to the thrashing-cylinder.
This invention also relates to the construction of the supporting-frame, and to the construction of throat through which the grain is passed to the cylinder.

With these ends in view this invention relates to and consists in certain features of construction and combination of parts, as hereinafter described, and set forth in the claims.

Figure 1 of the accompanying drawings is a view in perspective from the left-hand front of a thrashing-machine and feeder illustrating this invention. Fig. 2 is a similar view from right-hand front from below. Fig. 3 is a perspective of a journal-box and hanger by which carrier-frame is supported. Fig. 4 is a similar view of vibrating rake or feeder, and Fig. 5 a sectional view showing the interior of the machine and the position of the grain in its progressive movement.
Letters of reference indicate corresponding parts in all of the features of the drawings.

As this invention is applicable to many of the well-known thrashing-machines now in use, we will proceed with the description thereof, referring to the thrashing-machine only as conjunctional thereto.

That the thrashing-machine may be adapted for either hand or machine feeding, as the case may require, the frame of the machine-feeder is removably secured to the thrashing-machine frame, a fragment of which is shown in the drawings.

A represents the side frame of the front portion of a thrashing-machine, B the front cross-sill, and C the arm usually provided to support the ordinary feed-board and table. The bottom portion of the feeder-frame D is placed in a socket, as *d*, from which point the frame-piece D extends upwardly and forwardly, as shown, the middle portion thereof secured by removable bolts to the forward end portion of the arm C, the upper end portion of said frame D projected above said arm C as a support for the carrier-shaft E, band-cutter shaft F', and the cap G, the said cap forming a rearwardly-descending throat leading from a grain-carrier, hereinafter described, to the thrashing-cylinder, said throat being deeper vertically at its front portion than at its rear portion, the side boards forming a part of the frame and support for a rotary compressor-shaft P, as hereinafter explained.

To the front of frame D there is supported in journal-boxes *b* a cross-shaft H, having a series of alternating crank portions, as *d*, to which is secured by journal-boxes *c* a series of rakes J, the free ends of which rest and vibrate on a cross-support *f*, the front ends receiving from the cranked shaft H a rotary reciprocating movement upward and rearward and downward and forward. The rakes J are formed substantially as shown in Fig. 4, having a bottom board *g*, side boards *h* projected upwardly from said bottom board, having serrated upper edges, as *i*, tapering from the front to the rear portion, and at the front end portion a downwardly-projected side, as *j*, by which the side portions of the rakes overlap each other, as shown at X, Fig. 2, to prevent clipping.

The bundle-carrier K is constructed as follows: Having side frame-piece $k$, joined by cross-girders, (not shown,) and a floor, as $l$, and side boards $m$. At the rear end of the frame-piece $k$ there is provided a metal plate L, having an outwardly-projected sleeve, as $n$, which serves as a journal-box for the driving-shaft E, as well as a trunnion by which the carrier-frame is pivotally secured to the frame D, the trunnions resting in the hanger M and secured therein by a cap $o$. Upon the driving-shaft E, in addition to the sprockets $p$, that carry the chain N, there is loosely mounted a driving sprocket-wheel $q$, having a chain engagement with a similar wheel $r$ on the end of the cranked shaft H, by which the wheel $q$ is rotated by engagement with chain N, and on the opposite end of said shaft an actuating-pulley $r'$. On the outer face of the hub of wheel $q$ is provided a series of clutch-teeth $s$, adapted to engage a similar series of teeth on a sliding clutch, as $t$, secured in a sliding relation to a shaft E by a feather in the usual way, and about said clutch is provided an annular groove $u$, into which is fitted the prongs of a shipping-lever, as $v$, said lever having a pivotal connection with an arm $w$, secured to the carrier-frame, and on the end of the shaft E is provided a collar $y$, between which and the clutch $t$ is placed a coil-spring $z$, the energy of which is exerted against the clutch $t$ to hold it in engagement with the hub of the wheel $q$. To disengage the clutch, the lever $v$ is brought into action to move the clutch from such engagement. On the front portion of the carrier-frame is provided a cross-shaft $a$, upon which is mounted a sprocket-wheel $a^2$, corresponding with similar wheels $p$ on shaft E. About these wheels are placed chains N', having cross-slots $a^3$, forming an open carrier belt or apron, and at the upper front end portion is provided a cross-bar $a^4$ as a support for the division-board O, said bar being provided with standards $a^5$, between which the front end of board O is loosely secured, the rear end of said board having a pivotal connection $a^6$ with the hangers $a^7$, whereby the front end of the board may be raised up to remove obstructions that may gather thereunder.

The front end of the carrier-frame is supported on suitable legs, as $a^8$, pivotally secured to the frame, as shown at $a^9$. The inclination of the carrier-body may be varied vertically by moving the foot of the said legs about their pivotal connection with the carrier, which may be rotated about its pivotal connection with the frame D. To remove the carrier the cap O may be raised and the trunnion $n$ lifted from the hanger.

At the upper front portion of the throat G', on a plane above the plane of the thrashing-cylinder, there is provided a rotary band-cutter, as F, supported in suitable journal-boxes, as $a^{18}$, secured to the upper portion of the frame D. On the shaft F' thereof is placed a series of flanged sleeves $a^{11}$, to each of which is secured a knife $b'$, and on the end of said shaft a pulley $b^2$, by which the said shaft and the knives secured thereto are rotated.

In the throat G', formed by the cap G, and to the sides $G^2$ thereof, in suitable journal-boxes, is supported a rotary compressor mounted on said shaft P, having mounted thereon a pulley $b^3$, and between the journals thereof cross-heads, as $b^4$, having secured at the ends thereof presser-bars $b^5$, as shown in Figs. 1 and 2. The object of said rotary compressor is to press the grain down upon the rakes J, by the joint operation of which the grain is fed to the thrashing-cylinder Q, as shown in Fig. 5.

On the left-hand side of the machine and near the bottom portion of the frame D there is provided an idler $d^2$, by which the driving-belt is held in engagement with the pulley $r'$ on the cranked shaft.

To operate the several parts of the feeder, a driving-pulley S is mounted on the end of the thrashing-cylinder shaft T, (see Fig. 1,) about which is placed a driving-belt U, that is passed forward and about a tightening-pulley $d^3$, thence rearwardly and over the beater-pulley $b^3$, and forward and about a pulley $b^2$, mounted on the band-cutter shaft F'; thence rearwardly and downwardly about pulley $r'$, mounted on the cranked shaft H; thence about an idler $d^2$, placed below and in front of the rear portion of said pulley $r'$, and thence rearwardly to the pulley S on the cylinder-shaft, whereby the cylinder, rotary compressor, band-cutter, and cranked shaft may have a constant belt engagement, the compressor and band-cutter revolving in the same direction as the cylinder, and the cranked shaft in the opposite direction, giving the band-cutter and compressor a downward and rearward movement and to the rakes J an upward and rearward movement.

The front portion of the cap G is secured to the upper portion of the frame D, the rear portion abutting against the cylinder-cap $G^4$, and may be removed with said frame, or the deck portion $G^3$ of the cap may be removed by releasing the hook $d^4$ and raising the deck off, leaving the sides and machinery in normal position.

The operation is as follows: The bundles of grain to be thrashed are placed on the carrier-heads toward the thrashing-cylinder on each side of the dividing-board O, by which the bundles are prevented from turning or getting into a transverse position. By this means there is a constant movement of bundles into the mouth of the feeder. As the bundles pass into the throat of the machine the bands are cut and the grain set on end, as shown in Fig. 5, the heads pressed down by the compressor onto the rakes and fed to the cylinder, thereby raising machine-feeding to a point equal, if not superior, to that of hand-feeding, and for the purpose of arresting the movement of the carrier and the flow of grain into the feeder, a cord $d^5$ is secured to the shipping-lever $v$ and extended forward to the operator, by means of which the clutch $t$ may be disengaged from the wheel $q$, allowing the said wheel to rotate loosely on the shaft E while the carrier is at rest.

We are aware that some of the features herein shown have been used in connection with thrashing-machines; but we are not aware that they have been arranged and used as herein shown and described, nor that the same desirable results have been attained.

Therefore, having fully described the nature and object of our invention, what we claim, and desire to secure by Letters Patent, is—

1. In a thrashing-machine, the combination, with the thrashing-cylinder, a bundle-carrier feeding device located above and in front of the cylinder, a grain-throat leading downwardly from the end of the bundle-carrier to the cylinder, rocking reciprocating rakes forming the bottom of the throat, the upper ends of the rakes having the greatest throw and located below the end of the bundle-carrier, and a rotary band-cutter located above the rear end of the bundle-carrier, the grain-throat being enlarged vertically immediately to the rear of the band-cutter, of a rotary compressor having a positive rotary movement and located in the upper portion of the throat in proximity to the thrashing-cylinder, whereby the grain upon leaving the band-cutter is first thrown over on end, heads downward, and the butts then thrown back and heads depressed, substantially as set forth.

2. In a thrashing-machine, the combination, with a thrashing-cylinder, a bundle-carrier, and a grain-throat leading downwardly and rearwardly from the end of the bundle-carrier to the cylinder and gradually contracting vertically as it extends rearwardly, the bottom of the throat nearest the carrier being depressed, forming a steep decline, of a band-cutter located over the rear end of the bundle-carrier in position to throw the butts of the grain over as the heads drop from the carrier, and a positively-driven rotary compressor located in the upper portion of the throat in proximity to the thrashing-cylinder, in position to beat back the butts and depress the heads of the grain as they come in contact with the cylinder, substantially as set forth.

3. The combination, with a thrashing-machine frame, of a feeder-supporting frame comprising oblique posts, the end of the thrasher-frame and the ends of the oblique posts being fitted, the one with sockets and the other with projections adapted to removably enter the sockets, and means for securing the upper portions of the oblique posts to the thrashing-machine frame, substantially as set forth.

4. The combination, with the stationary portion of the feeder-frame, of a vertically-swinging portion carrying the bundle-carrier feed, the said stationary portion and swinging portion being provided, the one with journals and the other with two-part bearings, whereby the swinging portion may be readily detached from the stationary portion, substantially as set forth.

5. The combination of the bundle-carrier K, the rotary band-cutter F, and a series of rotary reciprocating rakes J, having upwardly-projected sides, as $h$, and a downwardly-projected side portion, as $j$, substantially as set forth.

6. The combination of the bundle-carrier K, the rotary band-cutter F, and a series of rotary reciprocating rakes J, having upwardly-projected sides, as $h$, and a downwardly-projected side portion, as $j$, substantially as shown, and for the purpose set forth.

7. In combination, the bundle-carrier K, the rotary band-cutter F, a series of rakes J, having upwardly-projected sides, as $h$, and a downwardly-projecting side portion $j$, and a shaft having alternating cranks which are connected to the rakes and impart thereto a rotary reciprocating movement, substantially as set forth.

In testimony whereof we have hereunto set our hands this 6th day of March, A. D. 1889.

ANDREW J. SCOFIELD.
 CHARLES W. SEVILLE.
 GEORGE E. WILSON.
 ROBERT H. DIXON.

Witnesses for Scofield and Seville:
 GEO. W. JENKINS,
 J. W. ZOLLARS.

Witnesses for Wilson and Dixon:
 E. D. BUFFINGTON,
 R. S. BUCHANAN.